United States Patent
Li et al.

(10) Patent No.: US 11,822,115 B2
(45) Date of Patent: Nov. 21, 2023

(54) DISPLAY APPARATUS

(71) Applicant: Hisense Visual Technology Co., Ltd., Shandong (CN)

(72) Inventors: Fulin Li, Shandong (CN); Mingsheng Qiao, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/580,285

(22) Filed: Jan. 20, 2022

(65) Prior Publication Data

US 2022/0146744 A1 May 12, 2022

Related U.S. Application Data

(63) Continuation of application No. PCT/CN2020/132198, filed on Nov. 27, 2020.

(30) Foreign Application Priority Data

Nov. 29, 2019 (CN) .......................... 201911205501.2
Nov. 29, 2019 (CN) .......................... 201911205789.3

(Continued)

(51) Int. Cl.
*F21V 8/00* (2006.01)
*G02F 1/13357* (2006.01)

(52) U.S. Cl.
CPC ......... *G02B 6/0073* (2013.01); *G02B 6/0068* (2013.01); *G02B 6/0083* (2013.01); *G02F 1/133603* (2013.01)

(58) Field of Classification Search
CPC .. G02B 6/0073; G02B 6/0068; G02B 6/0083; G02F 1/133603
See application file for complete search history.

(56) References Cited

U.S. PATENT DOCUMENTS 8,013,948 B2 * 9/2011 Park .................. G02F 1/133603
362/633
9,971,197 B2 * 5/2018 Song ......................... F21V 7/04
(Continued)

FOREIGN PATENT DOCUMENTS

CN 105258027 A * 1/2016 ....... G02F 1/133524
CN 108803149 A 11/2018
(Continued)

OTHER PUBLICATIONS

Li, CN-110398857-A, Nov. 2019 (Year: 2019).*
International Search Report, dated Feb. 25, 2021, from PCT/CN2020/132198 filed Nov. 27, 2020.

*Primary Examiner* — Mary Ellen Bowman
(74) *Attorney, Agent, or Firm* — Workman Nydegger (57) ABSTRACT

Disclosed in the present application is a display apparatus, including a backlight module and a display panel. The backlight module includes a light emitting diode. The display panel, disposed on a light emitting side of the backlight module, and configured to image display; wherein the backlight module comprises a LED board with one or more LEDs; and the LED board includes: a circuit board configured to provide power, and comprising a plurality of pads for soldering the one or more LEDs; a reflective coating, configured to cover the circuit board, and comprising a plurality of openings for exposing the plurality of pads; and the one or more LEDs, configured to be soldered on the plurality of pads in the plurality of openings.

12 Claims, 7 Drawing Sheets

(30) Foreign Application Priority Data

Nov. 29, 2019 (CN) .......................... 201922112301.4
Nov. 29, 2019 (CN) .......................... 201922112302.9

(56) References Cited

U.S. PATENT DOCUMENTS

2015/0060905 A1    3/2015  Nam et al.
2020/0326594 A1*  10/2020  Chang ............... G02F 1/133605

FOREIGN PATENT DOCUMENTS

| CN | 109459886 A | 3/2019 |
| CN | 109709722 A | 5/2019 |
| CN | 110398857 A | 11/2019 |
| CN | 110456574 A | 11/2019 |
| CN | 10727145 A | 1/2020 |
| CN | 210982989 U | 7/2020 |
| CN | 210982990 U | 7/2020 |
| CN | 111505868 A | 8/2020 |
| KR | 20110082743 A | 7/2011 |

* cited by examiner

DISPLAY APPARATUS

CROSS REFERENCE TO RELATED APPLICATIONS

The present disclosure is a continuation application of International Application No. PCT/CN2020/132198 filed Nov. 27, 2020, which claims priority to Chinese Patent Application No. 201911205501.2, filed on Nov. 29, 2019 and entitled "DISPLAY APPARATUS", Chinese Patent Application No. 201922112301.4, filed on Nov. 29, 2019 and entitled "DISPLAY APPARATUS", Chinese Patent Application No. 201911205789.3, filed on Nov. 29, 2019 and entitled "DISPLAY APPARATUS", and Chinese Patent Application No. 201922112302.9, filed on Nov. 29, 2019 and entitled "DISPLAY APPARATUS", the entire contents of which are incorporated herein by reference.

FIELD

The present disclosure relates to display technology, in particular to a display apparatus.

BACKGROUND

With the development of display technology, a liquid crystal display (LCD) is widely used in the display field. LCD panel itself cannot emit light, thus a backlight module is required for display. However, due to the limitation of characteristics of the liquid crystal panel, light leakage phenomenon in different degrees often occurs, which limits contrast improvement. Therefore, local dimming for the backlight module is proposed, by which backlight of different areas can be controlled individually. In this way, the brightness of backlight corresponding to a highlighted part of a displayed image can reach the maximum, while the brightness of backlight corresponding to a dark part in the image may be decreased, thereby achieving better contrast.

A mini light emitting diode (Mini LED) has become a hot topic in the LCD technology as backlight. Unlike the conventional liquid crystal display with an edge-lit backlight module depending on a light guide plate, the Mini LED solution uses a huge quantity of LEDs as a backlight source, which can not only realize thinning of the backlight module, but also realize dynamic control with more finesse and improve the display effect.

However, in the actual applications, there are still issues such as in manufacture process and optical aspects.

SUMMARY

The present disclosure provides a display apparatus, including: a backlight module, configured to provide backlight; and a display panel, disposed on a light emitting side of the backlight module, and configured for image display. Wherein the backlight module includes a LED board with one or more LEDs serving as a backlight source; and the LED board includes: a circuit board with a bearing and support function, configured to provide power, and including a plurality of pads for soldering the one or more LEDs; a reflective coating, configured to cover the circuit board, and including a plurality of openings for exposing the plurality of pads; and the one or more LEDs, soldered on the plurality of pads in the plurality of openings; wherein a size of the first opening is greater than a size of the first LED, and the size of the first opening meets a requirement of soldering the first LED after expansion and contraction of the circuit board.

In some embodiments of the present disclosure, both the circuit board and the first LEDs are rectangular, and a long side of the first LED is parallel to a short side of the circuit board.

In some embodiments of the present disclosure, the first opening in the reflective coating is rectangular, and a long side of the first opening is parallel to the long side of the first LED.

In some embodiments of the present disclosure, a size of a long side of the circuit board, a size of a short side of the first opening, and a size of a short side of the first LED meet:

$$Py - Cy \geq (2\%_{00} - 5\%_{00}) \times Ly;$$

where Py represents a length of the short side of the first opening, Cy represents a length of the short side of the first LED, and Ly represents a length of the long side of the circuit board.

In some embodiments of the present disclosure, a size of the long side of the first LED and a size of the long side of the first opening meet:

$$Cx < Px \leq Cx + d;$$

where Cx represents a length of the long side of the first LED, Px represents a length of the long side of the first opening, and d represents a length of electrodes of the first LED in a direction parallel to the long side of the first LED.

In some embodiments of the present disclosure, the backlight module includes a plurality of LED board, and respective circuit boards of the plurality of LED boards are arranged in a direction parallel to a short side of the circuit board.

In some embodiments of the present disclosure, the size of the first LED is 50 μm-300 μm.

In some embodiments of the present disclosure, a length of the circuit board is 200 mm-800 mm, and a width of the circuit board is 100 mm-500 mm.

In some embodiments of the present disclosure, the backlight module further includes: a protective layer, configured to cover a surface of a side, facing away from the circuit board, of the reflective coating and a surface of a side, facing away from the circuit board, of the first LED.

In some embodiments of the present disclosure, the backlight module further includes: a transparent substrate, disposed on a side, facing away from the circuit board, of the protective layer; a diffuser, disposed on a side, facing away from the protective layer, of the transparent substrate; and an optical sheet, disposed on a side, facing away from the transparent substrate, of the diffuser.

The display apparatus of the present disclosure includes: a backlight module, configured to provide the backlight; and a display panel, disposed on a light emitting side of the backlight module, and configured for image display. The backlight module includes: a LED board with one or more LEDs, serving as the backlight source. The LED board includes: a circuit board with the bearing and supporting function, configured to provide power, and including the plurality of pads for soldering the one or more LEDs; the reflective coating, configured to cover the circuit board, and including the plurality of openings for exposing the plurality of pads; and the one or more LEDs, soldered on the plurality of pads in the plurality of openings. The size of a first opening among the plurality of openings is greater than the size of a first LED among the one or more LEDs, and the size of the first opening meets the requirement of soldering the first LED after expansion and contraction of the circuit board. The design that the size of the first opening is greater than the size of the first LED may ensure that the first LED may successfully make contact with and be soldered on the pad in the opening after transferred to be above the corresponding opening. However, since the circuit board usually has the problem of expansion and contraction, the size of the opening may be increased to tolerate a move distance due to expansion and contraction of the circuit board on the basis of the size of the LED, so that even if expansion and contraction of the circuit board occur and the areas of the opening and the pad shift, the LED may still be in contact with the pad in the opening after transferred to intended positions, and electrical connection between the electrodes of the LED and the pad of the circuit board is realized.

The present disclosure provides a display apparatus, including: a backlight module, configured to provide backlight; and a display panel, disposed on a light emitting side of the backlight module, and configured for image display; wherein the backlight module includes: a LED board with a plurality of LEDs, serving as a backlight source; the LED board includes: a circuit board, having a bearing and support function, and configured to provide power; the plurality of LEDs, disposed on the circuit board; and a protective layer, configured to cover the plurality of LEDs and the circuit board, and configured to encapsulate and protect the plurality of LEDs; and the backlight module further includes: a transparent substrate, disposed on a side, facing away from the plurality of LEDs, of the protective layer; and an attachment layer, located between the protective layer and the transparent substrate, and configured attach the protective layer and the transparent substrate; where a refractive index of the attachment layer is greater than a refractive index of the transparent substrate.

In some embodiments of the present disclosure, the refractive index of the attachment layer is greater than or equal to a refractive index of the protective layer.

In some embodiments of the present disclosure, the refractive index of the protective layer is 1.4-1.6.

In some embodiments of the present disclosure, the refractive index of the transparent substrate is 1.4-1.5.

In some embodiments of the present disclosure, a thickness of the attachment layer is less than 0.1 mm.

In some embodiments of the present disclosure, a thickness of the transparent substrate meets an optical distance of the plurality of LEDs.

In some embodiments of the present disclosure, the thickness of the transparent substrate is 1 mm-3 mm.

In some embodiments of the present disclosure, the LED board further includes: a reflective coating, disposed on a side, close to the plurality of LEDs, of the circuit board, and including openings for exposing the plurality of LEDs.

In some embodiments of the present disclosure, a size of a first LED among the plurality of LEDs is 50 µm-300 µm, wherein the first LED is a LED of the plurality of LEDs.

In some embodiments of the present disclosure, the backlight module further includes: a diffuser, disposed on a side, facing away from the protective layer, of the transparent substrate; and an optical sheet, disposed on a side, facing away from the transparent substrate, of the diffuser.

DETAILED DESCRIPTION

In order to make the above objectives, features, and advantages of the present disclosure more obvious and understandable, the present disclosure will be further described below with reference to the accompanying drawings and embodiments. However, exemplary embodiments can be implemented in various forms, and should not be construed as being limited to the embodiments set forth herein; on the contrary, the provision of these embodiments makes the present disclosure more comprehensive and complete, and fully conveys the concept of the exemplary embodiments to those skilled in the art. The same reference numerals in the figures indicate the same or similar structures, and thus their repeated description will be omitted.

The words expressing position and direction described in the present disclosure are all illustrated by taking the drawings as examples, but they can also be changed according to needs, and the changes made are all included in the protection scope of the present disclosure. The drawings in the present disclosure are only used to illustrate the relative position relationship and do not indicate the true scale.

In the manufacturing process of LEDs, like Mini LEDs or micro LEDs, the LEDs need to be soldered on a circuit board through a die-bonding process to prepare a LED board. The circuit board has to go through multiple manufacture processes and transportation, etc., and there may be expansion and contraction phenomena, which will inevitably cause pads on the circuit board to shift. However, the Mini LEDs or micro LEDs are small in size, and the offset of the pads is enough to cause the LEDs to fail to be accurately soldered to corresponding pads, resulting in bad soldering of the LEDs.

Figure 1:
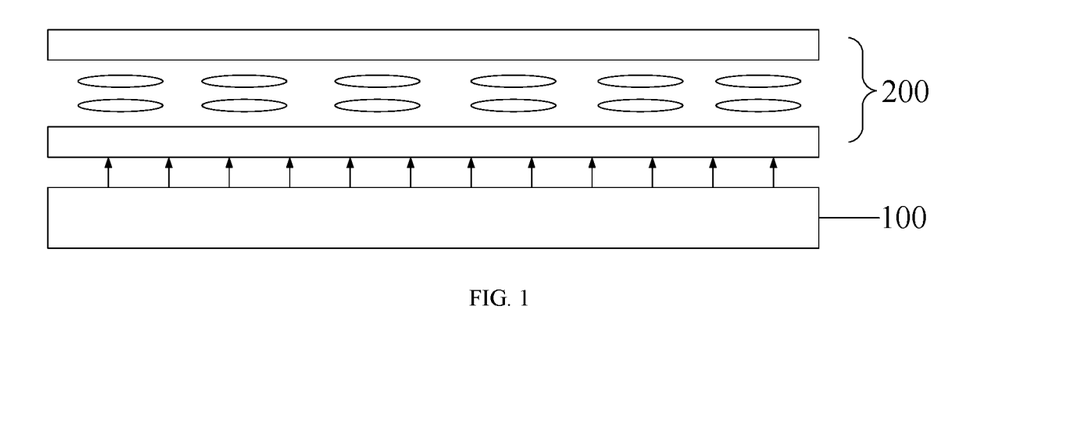
FIG. 1 illustrates a cross-sectional view of a display apparatus according to some embodiments of the present disclosure.

FIG. 1 is a schematic structural diagram of a display apparatus according to some embodiments of the present disclosure. As shown in FIG. 1, the display apparatus according to embodiments of the present disclosure includes the following modules.

A backlight module 100, configured to provide backlight. The backlight module is able to uniformly emit light in the entire light emitting surface so as to provide a panel with sufficient brightness and uniform distribution light so that the panel may display images normally.

A display panel 200, disposed on a light emitting side of the backlight module 100 and configured to display images. The display panel 200 has a plurality of pixel units in an array, where the transmittance and color of the light incident to each pixel unit from the backlight module 100 can be controlled individually, so that the light transmitted by all the pixel units forms the displayed image.

The display apparatus according to embodiments of the present disclosure may be a display device such as a liquid crystal display panel, a liquid crystal display screen, and a liquid crystal television, and may also be a mobile terminal such as a mobile phone, a tablet computer, and a smart frame. The backlight module is adopted in the display apparatus to provide the backlight, and light emitted from the backlight module is modulated by the display panel to realize image display. The backlight module in embodiments of the present disclosure may use a Mini LED board as a light source. A size of a Mini LED is smaller than that of a conventional LED. A large quantity of Mini LEDs is used as a backlight source, so dynamic control with more finesse may be realized, and dynamic contrast of liquid crystal display may be improved.

The backlight module 100 according to embodiments of the present disclosure includes the mini LED board (Mini LED board) serving as the backlight source.

Figure 2:
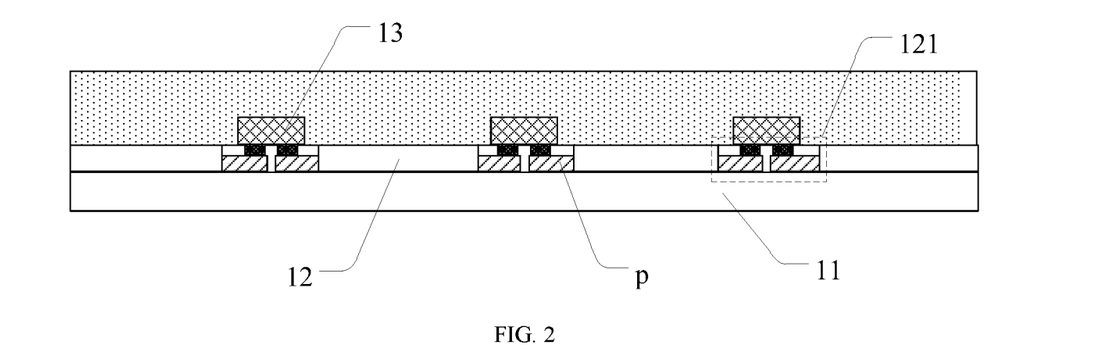
FIG. 2 illustrates a cross-sectional view of a Mini LED board according to some embodiments of the present disclosure.

FIG. 2 illustrates a cross-sectional view of the Mini LED board according to embodiments of the present disclosure. As shown in FIG. 2, the Mini LED board includes: a circuit board 11, a reflective coating 12 and mini LEDs 13.

The circuit board 11 has a bearing and support function, and configured to provide power. In the embodiments of the present disclosure, the circuit board 11 is configured to provide a driving electrical signal for the mini LEDs 13. The mini LEDs 13 and the circuit board 11 are separately manufactured. A surface of the circuit board 11 includes a plurality of pads p configured to solder the mini LEDs. After being manufactured, the mini LEDs 13 are transferred to be above the pads of the circuit board 11, and are soldered on the circuit board 11 through a process such as reflow soldering, so that the mini LEDs 13 may be driven to emit light by controlling an input signal of the circuit board 11.

In some embodiments, the circuit board 11 may be a printed circuit board (PCB). The PCB includes an electronic circuit and an insulating layer. The insulating layer exposes the pads for soldering the mini LEDs 13 to the electronic circuit and covers the rest.

Alternatively, the circuit board 11 may also be an array substrate formed by fabricating a thin film transistor drive circuit on a base substrate, and a surface of the array substrate has conductors (namely, the pads in openings) connected to the thin film transistor drive circuit. Electrodes of the mini LEDs 13 are soldered to the conductors in a one-to-one correspondence manner. A base or base substrate of the circuit board 11 may be made of flexible materials to form a flexible display apparatus.

In the embodiments of the present disclosure, the circuit board 11 is of plate shape, and is rectangular or square as a whole. A length of the circuit board 11 is 200 mm-800 mm, and a width of the circuit board 11 is 100 mm-500 mm. According to a size of the display apparatus, the backlight module may include a plurality of circuit boards 11, and the circuit boards 11 are spliced to provide backlight. In order to solve optical problems caused by splicing of the circuit boards 11, splicing gap between adjacent circuit boards 11 should be as small as possible, and even seamless splicing is desired.

The reflective coating 12 is configured to cover the circuit board 11. The reflective coating 12 may be a protective layer located above the circuit board 11. In a case where the surface of the circuit board 11 is coated with a reflective material, the protective layer also has a reflective effect, and may reflect light emitted into one side of the circuit board 11, thereby improving the efficiency of light utilization. In the embodiments of the present disclosure, the reflective coating 12 may be made of materials such as white oil.

Figure 3:
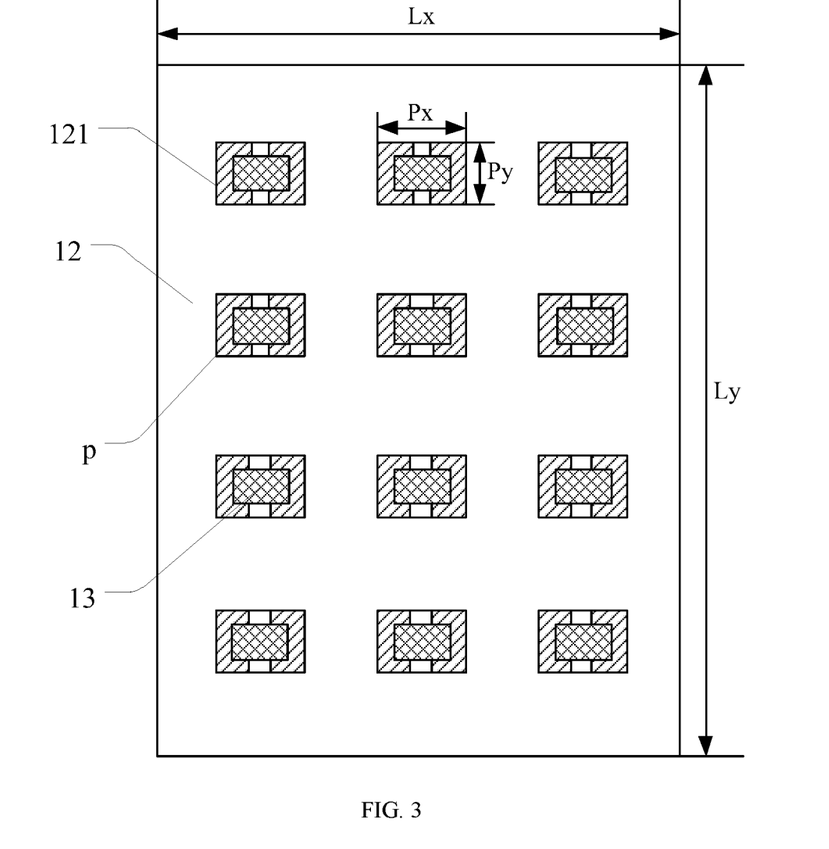
FIG. 3 illustrates a top view of a Mini LED board according to some embodiments of the present disclosure.

FIG. 3 illustrates a top view of the Mini LED board according to embodiments of the present disclosure. As shown in FIG. 3, the surface of the circuit board is coated with the reflective coating 12 after wiring is completed, and areas where the pads p configured to solder the mini LEDs are located are exposed through a process such as etching to form openings 121 as shown in FIG. 3. After the openings 121 are formed, the mini LEDs 13 are soldered on the corresponding pads p of the circuit board, so that the mini LEDs 13 are soldered on the circuit board 11.

The mini LEDs 13 are soldered on the pads p in the openings 121. Unlike ordinary light emitting diodes, the mini LEDs 13 refer to mini LED chips. Since the mini LEDs 13 are very small in size, the light emitting chips are beneficial to dynamic local dimming in smaller zones, which contributes to improving contrast of an image. In the embodiments of the present disclosure, the mini LEDs 13 may be monochromatic mini LEDs with a size of 50 μm-300 μm.

A mini LED 13 usually includes two electrodes that need to be soldered on two adjacent pads p on the circuit board 11. Before soldering, the mini LEDs 13 may be transferred to be above the corresponding pads by mechanical transfer. A robot arm that is used to transfer the mini LEDs 13 may transfer the mini LEDs 13 to corresponding areas above the circuit board 11 according to a nominal value of the openings in the circuit board 11. However, a resin material usually used for the substrate of the circuit board 11 is prone to being expanded and contracted after the circuit board 11 is subjected to various process steps, transportation, etc. Then, the openings on the reflective coating may shift with the expansion and contraction of the circuit board, while the mini LEDs 13 may still follow opening areas on a standard circuit board to move. Since the size of the mini LEDs 13 is a micron dimension, a very small shift of the openings in the circuit board 11 may cause the problem that the mini LEDs 13 cannot be aligned with the pads in the openings, thereby resulting in bad soldering of the mini LEDs 13.

In view of the above issue, in the embodiments of the present disclosure, as shown in FIG. 2 and FIG. 3, a size of the openings 121 on the reflective coating 12 may be appropriately increased, so that the size of the openings 121 is larger than that of the mini LEDs 13, and meets the requirement of soldering the mini LEDs after the circuit board 11 expands or contracts.

In some embodiments, the size of the openings 121 may be designed to be greater than the size of the mini LEDs 13, so as to ensure that the mini LEDs may successfully make contact with and be soldered to the pads p in the openings 121 after transfer. Since the circuit board 11 usually has the problem of expansion and contraction, the size of the openings 121 may be increased to tolerate a movement distance produced by the circuit board 11 expansion or contraction on the basis of the size of the mini LEDs 13, so that even if the circuit board 11 expands or contracts and the areas of the openings and the pads shift, the mini LEDs may still be in contact with the pads p in the openings after being transferred to intended areas, and electrical connection between the electrodes of the mini LEDs and the pads of the circuit board is realized.

In the manufacturing process, taking the difficulty of the process and shape requirements of products into consideration, as shown in FIG. 3, the circuit board 11 and the mini LEDs 13 may be usually designed into regular rectangles.

The mini LED board is formed by soldering the mini LEDs on the circuit board. Currently used display devices, whether a computer screen, a TV or a mobile phone, are generally rectangular, so a drive circuit board of the mini LED board serving as the backlight source may also be made to be rectangular.

However, the mini LEDs are not formed individually one by one in the manufacturing process, but are cut after growing an epitaxial layer and other structures on a base. The cutting accuracy may directly affect accuracy of the mini LEDs. Therefore, in order to simplify the process, the mini LEDs may be cut into rectangles.

The expansion and contraction of the circuit board are affected by materials used. Generally, the ratio of expansion and contraction is within the range of 2‰-5‰, and the degree of expansion and contraction is positively correlated with a length in this direction. Taking a circuit board with a length of 400 mm and a width of 200 mm as an example, the expansion and contraction of the circuit board 11 in the length direction may reach 80 μm-200 μm, while the expansion and contraction in the width direction may reach 40 μm-100 μm. That is to say, the offset of the openings of the circuit board 11 in the length direction of the circuit board may be greater than the offset of the openings in the width direction.

In order to ensure the soldering yield rate of the mini LEDs, long sides of the mini LEDs 13 are set to be parallel to short sides of the circuit board 11. The amount of expansion and contraction of the circuit board 11 in the direction of the long sides is relatively large, and the openings may have a large offset in the long side direction of the circuit board. The offset of the openings has relatively small effect on short sides of the mini LEDs 13 compared with effect on the long sides, this is because even if the openings are offset by a large distance, the short sides of the mini LEDs may also be located within the openings. Thus, contact of the electrodes of the mini LEDs with the pads in the openings is not affected, and the problem of bad soldering of the mini LEDs may be alleviated.

As shown in FIG. 3, in order to adapt to a shape of the mini LEDs 13, the openings 121 of the reflective coating 12 may also be set to be rectangular correspondingly. In addition, long sides of the openings 121 are set to be parallel to the long sides of the mini LEDs 13.

Theoretically, the size of the openings 121 is equal to the size of the mini LED 13 so that the electrodes of the mini LEDs 13 may be connected with the pads p in the openings 121. However, taking the expansion and contraction of the circuit board 11 and errors caused in the transfer process into consideration, the size of the openings 121 may be correspondingly increased on the basis of the size of the mini LEDs 13, so even if the above problems occur, it may be ensured that the mini LEDs 13 may be disposed inside the openings 121. The sizes of the mini LEDs 13 and the openings 121 are both micron dimensions. The long sides of the openings 121 are parallel to the long sides of the mini LEDs 13, and short sides of the openings 121 are parallel to the short sides of the mini LEDs 13, so the size of the openings 121 may adapt to the shape of the mini LEDs, without wasting of occupying space, and more mini LEDs may be disposed on the circuit board.

Figure 4:
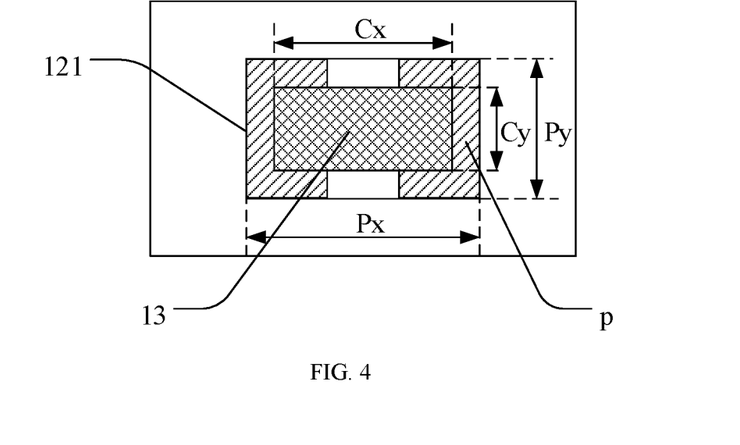
FIG. 4 illustrates a relationship between an opening and a mini LED in a top view according to some embodiments of the present disclosure.

FIG. 4 is a schematic top view of a relationship between the openings and the mini LEDs according to embodiments of the present disclosure. FIGS. 2 and 3 show a size relationship of the circuit board 11, the openings 121 and the mini LEDs 13. As shown in FIG. 2, a length of the long sides of the circuit board 11 is Ly, and a length of the short sides of the circuit board is Lx; and a length of the long sides of the openings 121 is Px, and a length of the short sides of the openings 121 is Py. As shown in FIG. 4, a length of the long sides of the mini LEDs 13 is Cx, and a length of the short sides of the mini LEDs 13 is Cy.

Taking the offset of the openings caused by the expansion and contraction of the circuit board into consideration, in embodiments of the present disclosure, the size of the long sides of the circuit board 11, the size of the short sides of the openings 121, and the size of the short sides of the mini LEDs 13 may meet the following relationship:

$$Py - Cy \geq (2\text{‰} - 5\text{‰}) \times Ly;$$

where Py represents the length of the short sides of the openings, Cy represents the length of the short sides of the mini LEDs, and Ly represents the length of the long sides of the circuit board.

The amount of expansion and contraction of the circuit board 11 in the long side direction is related to the length of the long sides. Due to different materials used in the circuit board 11, the degrees of expansion and contraction are also different. If the ratio of expansion and contraction of the circuit board materials is 2‰ to 5‰, the offset of the openings 121 on the circuit board in the long side direction of the circuit board may reach (2‰-5‰)×Ly. If the mini LEDs 13 still need to be located in the corresponding openings 121 after being transferred according to the intended areas, and be in contact with the pads in the openings 121 in case of the offset of the openings, the length of the short sides of the openings 121 should be increased by the offset in the long side direction of the circuit board 11 on the basis of the length of the short sides of the mini LEDs 13. Therefore, the size of the short sides of the mini LEDs 13 and the size of the short sides of the openings 121 are set to meet the above relationship, which may ensure that when the openings 121 shift, the corresponding mini LEDs 13 may still be transferred into the openings 121.

The size of the long sides of the mini LEDs 13 and the size of the long sides of the openings 121 may meet the following relationship:

$$Cx < Px \leq Cx + d;$$

where Cx represents the length of the long sides of the mini LEDs, Px represents the length of the long sides of the openings, and d represents a length of an electrode of each mini LED in a direction parallel to the long sides of the mini LED.

Figure 5:
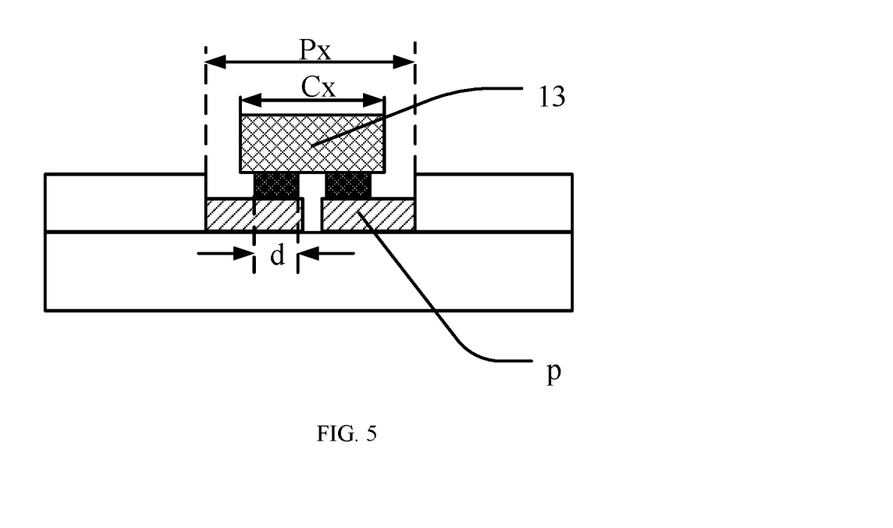
FIG. 5 illustrates a relationship between an opening and a mini LED in a side view according to some embodiments of the present disclosure.

A mini LED 13 includes two electrodes that are respectively soldered to the two pads p in the corresponding opening 121. FIG. 5 illustrates a relationship between the openings and the mini LEDs in side view according to embodiments of the present disclosure. As shown in FIG. 5, there is a certain gap between the two pads p in each opening 121. This is because there is also a gap between the two electrodes of each mini LED 13, and a length of the gap in the direction of the long sides of the mini LED 13 accounts for about one third of the length of the long sides, so when the circuit board 11 is manufactured, the gap between the two pads connected with the same mini LED is made to adapt to the gap between the two electrodes of the mini LED. The openings 121 of the circuit board also have an offset in the direction of the short sides of the circuit board 11. Therefore, it is necessary to consider the size in the long side direction of the mini LEDs 13, the size in the long side direction of the openings 121 and an offset of the openings 121, and the two electrodes of a mini LED 13 can be connected to the two pads p in the corresponding opening 121.

In embodiments of the present disclosure, the length Px of the long sides of the openings 121 is set to be greater than the length Cx of the long sides of the mini LEDs 13. In addition, the length d of the electrodes of the mini LEDs 13 in the long sides direction of the mini LEDs is about one third of the long sides of the mini LEDs, and the electrode length d may already meet the offset of the openings 121, so the length Px of the long sides of the openings 121 may be set to meet Cx<Px≤Cx+d.

In some embodiments, the size of the mini LED board may not be too large. The mini LEDs need to be transferred to and then soldered on the circuit board after being manufactured. The yield rate of the mini LED board depends on the yield rate of the mini LEDs on the panel, so the greater the size of the panel, the lower the production yield rate. Therefore, a backlight module used in a large-size display apparatus may be formed by splicing a plurality of Mini LED boards.

Figure 6:
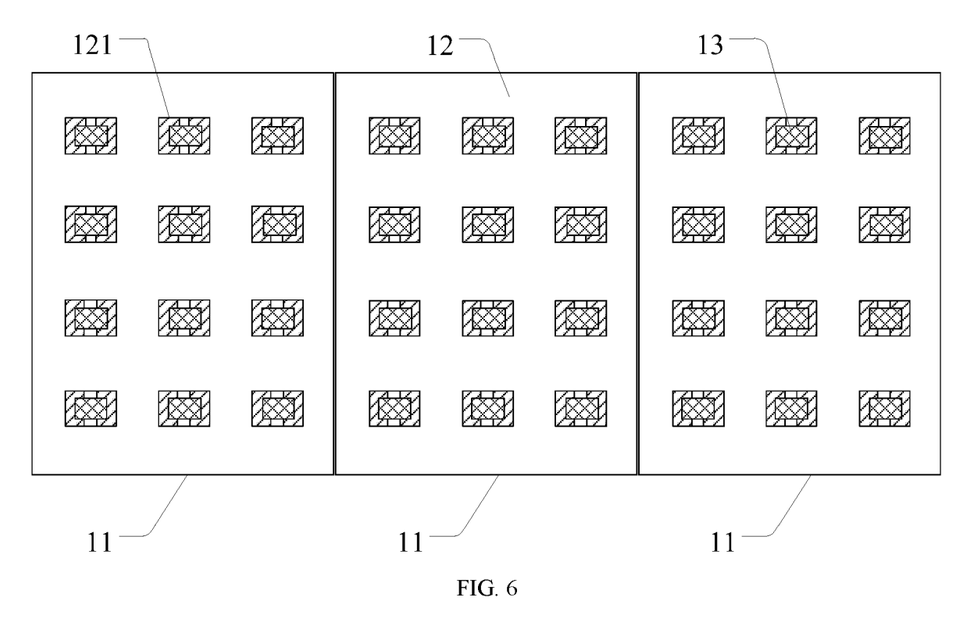
FIG. 6 illustrates a top view of a plurality of Mini LED boards according to some embodiments of the present disclosure.

FIG. 6 is a schematic top view of a plurality of Mini LED boards according to embodiments of the present disclosure. As shown in FIG. 6, the backlight module according to embodiments of the present disclosure includes a plurality of mini LED boards. Circuit boards 11 of a mini LED board are arranged along a direction parallel to short sides of the circuit board.

In some embodiments, a conventional display screen ratio is 16:9. Splicing square light board is not suitable for the measurement range of a Mini LED die-bonding device and a size of a display, so the circuit board 11 may be designed to be rectangular with a ratio of the long sides to the short sides being close to 2:1. When the size of the circuit boards 11 is smaller than a size of a required illuminating range, the quantity of circuit boards 11 may be increased along the direction of the short sides of the circuit boards 11.

In the display apparatus according to embodiments of the present disclosure, as shown in FIG. 2, a Mini LED in embodiments of the present disclosure further includes:

a protective layer 14, configured to cover a surface of a side, facing away from the circuit board 11, of the reflective coating 12 and a surface of a side, facing away from the circuit board 11, of mini LEDs 13.

The protective layer 14 is configured to encapsulate the mini LEDs 13, so as to effectively prevent falling off of the mini LEDs, damp and other unfavorable conditions. Materials used for the protective layer 14 include silica gel, epoxy resin or other colloidal materials with high transmittance. In some embodiments, the protective layer 14 may be formed on the surface of mini LEDs 13 by spraying or dot coating. According to the backlight module shown in FIG. 2, the protective layer 14 is manufactured by spraying across the entire surface, which has higher production efficiency. In some embodiments, dot coating using colloidal materials above the mini LEDs 13 to encapsulate the mini LEDs 13 may also be adopted. The dot-coating encapsulation manner may save colloidal materials and flexibly control the amount of spread, and may be used more often.

Figure 7:
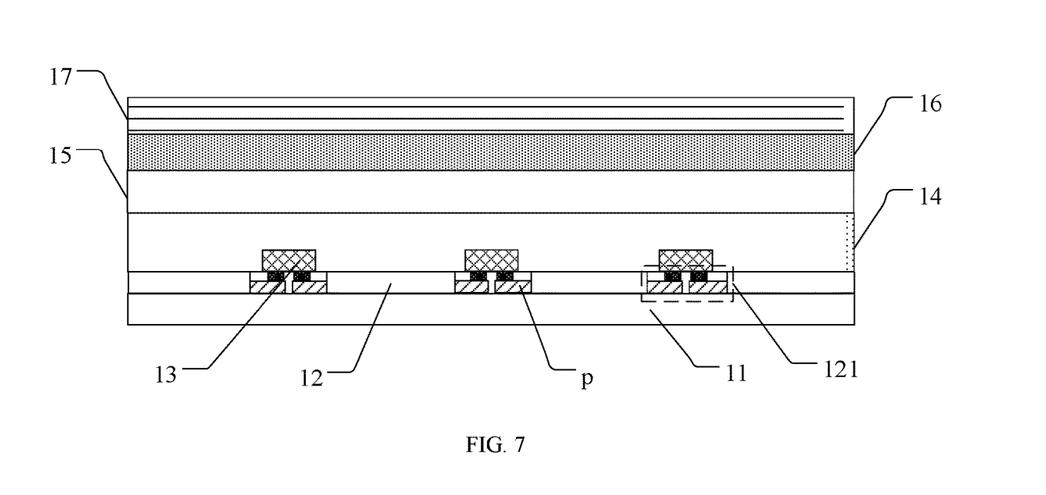
FIG. 7 illustrates a cross-sectional view of a backlight module according to some embodiments of the present disclosure.

FIG. 7 illustrates a cross-sectional view of the backlight module according to embodiments of the present disclosure. As shown in FIG. 7, the backlight module according to embodiments of the present disclosure further includes: a transparent substrate 15, a diffuser 16 and an optical sheet 17.

The transparent substrate 15 is disposed on a side, facing away from the circuit boards 11, of the protective layer 14. The transparent substrate 15 may allow light from the mini LEDs 13 to pass through, and is configured to support the diffuser 16. The transparent substrate 15 may be made from polymethyl methacrylate (PMMA) or polycarbonate (PC). As a support structure of the diffuser 16, the transparent substrate 15 makes light emitted from the mini LEDs 13 fully mixed before reaching the diffuser 16. In embodiments of the present disclosure, a thickness of the transparent substrate 15 meets the optical distance of the mini LEDs 13, so a backlight effect is ensured. In some embodiments, the thickness of the transparent substrate 15 is not greater than 10 mm.

The diffuser 16 is disposed on a side, facing away from the protective layer 14, of the transparent substrate 15. A scattering particle material is generally disposed in the diffuser 16, and after being emitted to the diffuser 16, light rays are continuously refracted and reflected by the scattering material, so as to homogenize the light to obtain the uniform light. The diffuser is generally made from at least one of polymethyl methacrylate (PMMA), polycarbonate (PC), polystyrene (PS), or polypropylene (PP), which is not limited here.

The optical sheet 17 is disposed on a side, facing away from the transparent substrate 15, of the diffuser 16. The optical sheet 17 may include one or more of a prismatic lens, a quantum dot film, a reflective polarizer, etc. The purpose of adding these films to the backlight module is to make the backlight module adapt to various practical applications. For example, the prismatic lens may change an exit angle of light, thereby changing a viewing angle of the display apparatus. The quantum dot film may provide quantum dot light emission with higher monochromaticity, and is applied to quantum dot TVs to improve the display color gamut of the TVs. The reflective polarizer may improve the utilization rate of light, and meanwhile, make emitted light have the property of polarization, so the use of a polarizer under a liquid crystal display panel is omitted.

The display apparatus in the present disclosure includes: the backlight module, configured to provide the backlight; and the display panel, disposed on the light emitting side of the backlight module, and configured to display the images. The backlight module includes: the mini LED board, serving as the backlight source. The mini LED board includes: the circuit board, having the bearing and support function, configured to provide power, and including a plurality of pads configured to solder the mini LEDs; the reflective coating, configured to cover the circuit board, and including a plurality of openings for exposing the pads; and the mini LEDs, soldered on the pads in the openings. The size of the openings is greater than the size of the mini LEDs, and the size of the openings meets the requirement of soldering the mini LEDs after the circuit board expands or contracts. The design that the size of the openings is greater than the size of the mini LEDs may ensure that the mini LEDs may successfully make contact with and be soldered to the pads in the openings when transferred to be above the corresponding openings. However, since the circuit board usually has the problem of expansion and contraction, the size of the openings may be increased to tolerate a movement distance produced by the circuit board expansion or contraction on the basis of the size of the mini LEDs, so that even if the circuit board expands or contracts and the areas of the openings and the pads shift, the mini LEDs may still be in contact with the pads in the openings when transferred to intended areas, thus electrical connection between the electrodes of the mini LEDs and the pads of the circuit board can be realized.

After Mini LED chips are soldered to the circuit board, the Mini LEDs may be driven to emit light through the circuit board. Light emitted from the Mini LEDs may first enter an air gap and then enter the optical film such as the diffuser. Because a refractive index of an air medium is small, when light enters the diffuser, the exit angle of the light may be decreased due to the refraction of the light, so the range of light spots that finally strikes on the diffuser is small, which results in uneven brightness of the backlight module such as brighter above the Mini LEDs and darker between two Mini LEDs.

In view of the above issue, the present disclosure provides another display apparatus.

Figure 8:
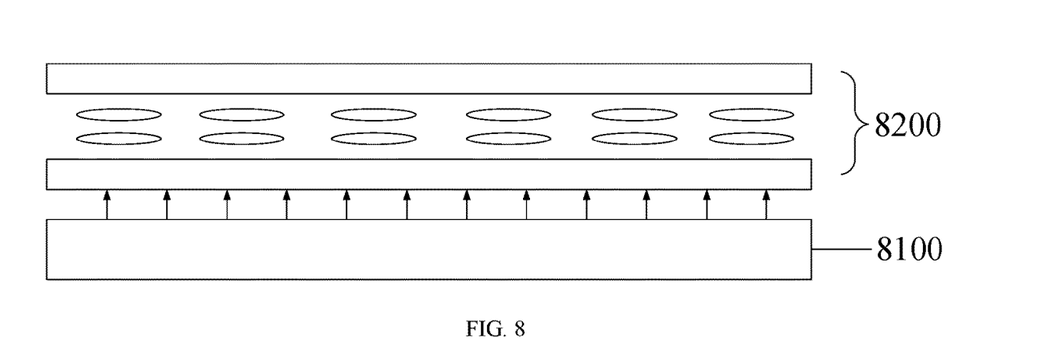
FIG. 8 illustrates a cross-sectional view of a display apparatus according to some embodiments of the present disclosure.

FIG. 8 is a schematic structural diagram of a display apparatus according to some embodiments of the present disclosure. As shown in FIG. 8, the display apparatus according to embodiments of the present disclosure includes: a backlight module 8100, configured to provide backlight, and capable of uniformly emitting light across the entire light emitting surface so as to provide a display panel with sufficient brightness and uniform distribution light so that the display panel may display images normally. The display apparatus further includes a display panel 8200, disposed on a light emitting side of the backlight module 8100 and configured to display images. The display panel 8200 has a plurality of pixel units in an array, where the transmittance and color of the light incident to each pixel unit from the backlight module 8100 can be controlled individually, so that the light transmitted by all the pixel units forms the displayed image.

The display apparatus according to embodiments of the present disclosure may be display devices such as a liquid crystal display panel, a liquid crystal display screen, and a liquid crystal television, and may also be a mobile terminal such as a mobile phone, a tablet computer, and a smart frame. The backlight module is adopted in the display apparatus to provide the backlight, and light emitted from the backlight module is modulated by the display panel to realize image display. The backlight module according to embodiments of the present disclosure may use a Mini LED board as a light source. A size of a Mini LED is smaller than that of a traditional LED. A large quantity of Mini LEDs is adopted as a backlight source, so dynamic control with more finesse may be realized, and dynamic contrast of liquid crystal display may be improved.

Figure 9:
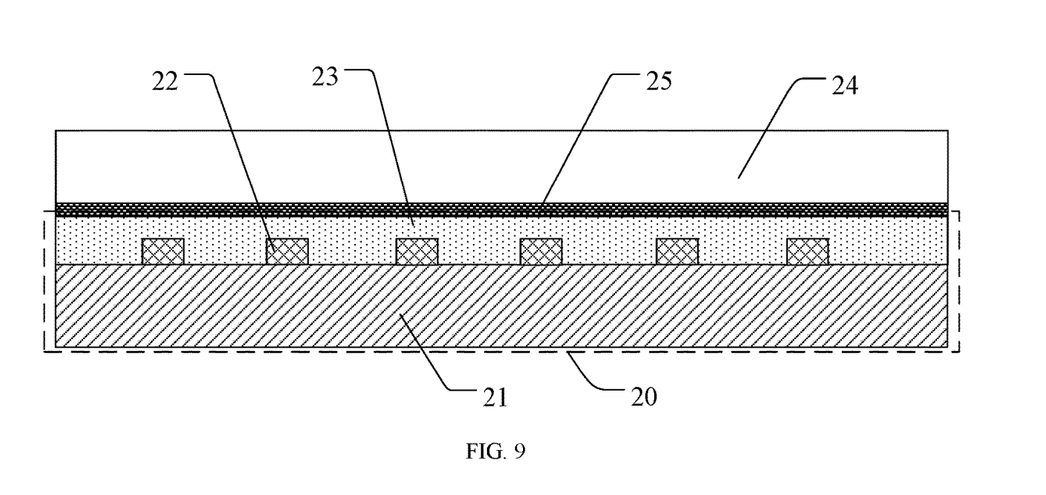
FIG. 9 illustrates a first cross-sectional diagram of a backlight module according to some embodiments of the present disclosure.

FIG. 9 is a first cross-sectional view of the backlight module according to embodiments of the present disclosure. As shown in FIG. 9, the backlight module 8100 according to embodiments of the present disclosure includes a mini LED board 20, a transparent substrate 24 and an attachment layer 25.

The mini LED board 20 includes a circuit board 21, mini LEDs 22 and a protective layer 23.

The circuit board 21 has a bearing and support function, and configured to provide power. In embodiments of the present disclosure, the circuit board 21 is configured to provide a driving electrical signal for the mini LEDs 22. The mini LEDs 22 and the circuit board 21 are separately manufactured. A surface of the circuit board 21 includes a plurality of openings configured to solder the mini LEDs. Each opening internally is provided with two pads configured to solder electrodes of the mini LEDs respectively. After being manufactured, the mini LEDs 22 are transferred to be above the pad openings of the circuit board 21, and are soldered on the circuit board 21 through a process such as reflow soldering, so that the mini LEDs 22 may be driven to emit light by controlling an input signal of the circuit board 21.

In some embodiments, the circuit board 21 may be a printed circuit board (PCB). The PCB includes an electronic circuit and an insulating layer. The insulating layer exposes the pads where the mini LEDs 22 are soldered in the electronic circuit and covers the rest.

Alternatively, the circuit board 21 may also be an array substrate formed by fabricating a thin film transistor drive circuit on a base substrate, and a surface of the array substrate has conductors (namely, the pads in the openings) connected to the thin film transistor drive circuit. Electrodes of the mini LEDs 22 are soldered to the conductors in a one-to-one correspondence manner. A base or base substrate of the circuit board 21 may be made of flexible materials to form a flexible display apparatus.

In embodiments of the present disclosure, the circuit board 21 is of plate shape, and is rectangular or square as a whole. A length of the circuit board 21 is 200 mm-800 mm, and a width of the circuit board 21 is 100 mm-500 mm. According to a size of the display apparatus, in embodiments of the present disclosure, the display apparatus may include a plurality of circuit boards 21, and the circuit boards 21 are spliced to provide backlight together. In order to solve optical problems caused by splice of the circuit boards 21, splicing seam between adjacent circuit boards 21 should be as small as possible, and even seamless splicing is desired.

The mini LEDs 22 are disposed on the circuit board 21. The mini LEDs 22 are soldered on the pads of the circuit board 21. Unlike ordinary light emitting diodes, the mini LEDs 22 refer to mini LED chips. Since the mini LEDs 22 are very small in size, the light emitting chips contribute to local dimming in a smaller region, which is beneficial to improve contrast of an image. In embodiments of the present disclosure, the mini LEDs 22 may be monochromatic mini LEDs with a size of 50 μm-300 μm.

The protective layer 23 is configured to cover the mini LEDs 22 and the circuit board 21. The protective layer 23 is configured to encapsulate the mini LEDs 22, so as to effectively prevent falling off of the mini LEDs, damp and other unfavorable conditions. Materials used for the protective layer 23 include silica gel, epoxy resin or other colloidal materials with high transmittance. In some embodiments, the protective layer 23 may be formed on the surface of each mini LED 22 by spraying or dot coating.

In embodiments of the present disclosure, the entire protective layer 23 is formed on the surfaces of the circuit board 21 and the mini LEDs 22 by spraying across the entire layer. Such manufacturing method can effectively improve the production efficiency, and has a better encapsulating effect for the mini LEDs 22.

The transparent substrate 24 is disposed on a side, facing away from the mini LEDs 22, of the protective layer 23. The transparent substrate in embodiments of the present disclosure is made of a high light-transparency material. The transparent substrate may allow light from the mini LEDs 22 to pass through, and is configured to support the diffuser. The transparent substrate 24 may be made from at least one of polymethyl methacrylate or polycarbonate, but is not limited to this. The transparent substrate 24 may further be made of other materials with high reflectivity and low light absorbance. This is because light will be reflected multiple times inside the transparent substrate 24, while the materials with high reflectivity and low absorbance may minimize the attenuation of light as it transmit in the transparent substrate 24, so the light utilization rate of the backlight module is improved, and power consumption is reduced. As a support structure of the diffuser, the transparent substrate 24 makes light emitted from the mini LEDs 22 fully mixed before reaching the diffuser.

In embodiments of the present disclosure, a thickness of the transparent substrate 24 meets an optical distance of the mini LEDs 22, so that the light emitted from the mini LEDs may be fully mixed when reaching the diffuser, and a backlight effect is ensured. In embodiments of the present disclosure, the thickness of the transparent substrate 24 is not greater than 10 mm.

In some embodiments, in order to reduce the overall thickness of the backlight module, the transparent substrate may be made of PMMA plate, and the thickness may be 1 mm-3 mm. The greater the thickness of the transparent substrate 24, the stronger a reducing action on emitted light. The mini LEDs 22 are smaller in size, and compared with traditional light emitting diodes, the distance between the mini LEDs 22 may be made smaller. Thus, the optical distance of the mini LEDs 22 may be much smaller than that of the traditional light emitting diodes. Then, by setting the thickness of the transparent substrate 24 to be 1 mm-3 mm, the light mixing requirements of the mini LEDs 22 may be met, and meanwhile, the reducing action of the transparent substrate 24 on light may be weakened.

Since the distance between the mini LEDs 22 is relatively small, it is impossible to dispose a bracket in the array of the mini LEDs 22 to support the diffuser. In embodiments of the present disclosure, by disposing the transparent substrate on the side, facing away from the mini LEDs 22, of the protective layer 23, the transparent substrate may further be used as a support structure for the diffuser. The diffuser is directly placed on the transparent substrate 24, so as to solve the above issue.

Figure 10:
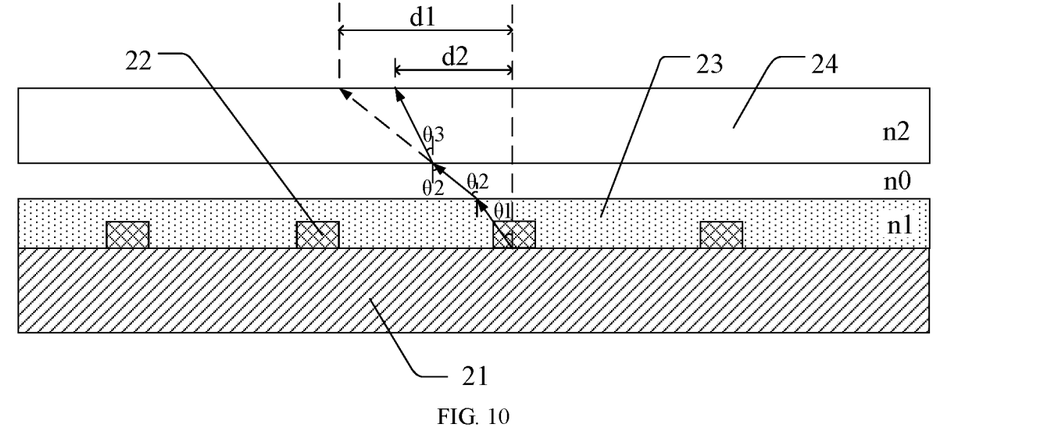
FIG. 10 illustrates a first light emitting path diagram of a backlight module according to some embodiments of the present disclosure.

FIG. 10 shows a first light emitting path diagram of the backlight module according to embodiments of the present disclosure. As shown in FIG. 10, in some embodiments, the transparent substrate 24 may be placed directly above the protective layer 23 to meet use requirements, but there may be an air gap between the protective layer 23 and the transparent substrate 24. The optical layer in the backlight module is a medium which is optically denser relative to the air medium. Light beam with an angle of θ1 emitted from the mini LEDs 22 firstly enters the medium of the protective layer 23, then an incident angle at which the light beam strikes an interface between the protective layer 23 and an air layer is θ1, and a refraction angle at which the light beam leaves the interface to air is θ2. As shown in FIG. 10, a refractive index of the protective layer 23 is n1, and a refractive index of the air is n0. According to the refraction law: n1 sin θ1=n0 sin θ2, the refractive index n1 of the protective layer 23 is greater than the refractive index n0 of the air medium, so the refraction angle θ2 is greater than the incident angle θ1. That is, the exit angle of the light beam entering the air is larger. If the light beam emitted to air is directly incident on the diffuser, a radius of the light coverage range on the diffuser is d1.

However, light needs to move from air to the transparent substrate 24. The refraction angle at which the light leaves the interface between air and the transparent substrate 24 is θ3. The refractive index of the transparent substrate 24 is n2, and according to the refraction law: n0 sin θ2=n2 sin θ3, the refractive index n2 of the transparent substrate 24 is greater than the refractive index n0 of the air. As such, the refraction angle θ3 at which the light enters the transparent substrate 24 from the air is smaller than the incident angle θ2. That is, the angle at which the transmitted light moves in the transparent substrate 24 becomes smaller. When leaving the transparent substrate 24, the radius of light coverage on the diffuser is d2.

As can be seen from FIG. 10, the transparent substrate 24 can reduce the light coverage on the diffuser, which causes uneven brightness like high brightness above the Mini LEDs and low brightness between the Mini LEDs.

In view of the uneven brightness issue, in embodiments of the present disclosure, as shown in FIG. 9, the backlight module is further internally provided with: an attachment layer 25, located between the protective layer 23 and the transparent substrate 24, and configured to attach the protective layer 23 and the transparent substrate 24. That is, the air gap between the protective layer 23 and the transparent substrate 24 is filled with the attachment material, so as to decrease the difference between the refractive index of the gap area and the refractive index of the transparent substrate 24. In some embodiments, the refractive index of the attachment layer 25 may be greater than the refractive index of the transparent substrate 24. In this way, when light enters the transparent substrate 24 from the attachment layer 25, the exit angle of the light increases, so that the coverage area of the light entering the diffuser is increased, the distribution density of the light at the adjacent areas of the Mini LEDs is increased, and accordingly the problem of uneven backlight brightness is alleviated.

Figure 11:
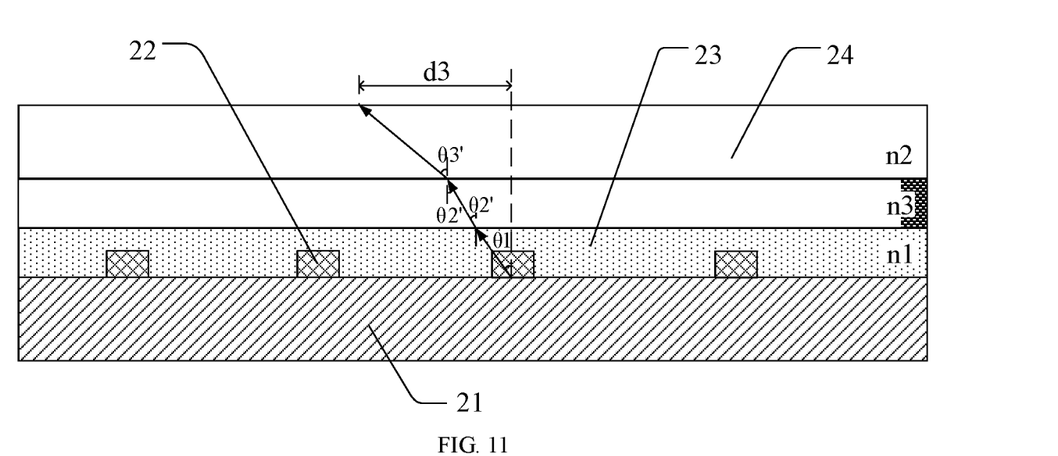
FIG. 11 illustrates a second light emitting path diagram of a backlight module according to some embodiments of the present disclosure.

FIG. 11 is a second light emitting path diagram of the backlight module according to embodiments of the present disclosure. As shown in FIG. 11, light moves at an angle θ1 from the mini LEDs 22 and enters the protective layer 23, then the incident angle of the light strikes the interface between the protective layer 23 and the attachment layer 25 is θ1. The refraction angle at which the light leaves the interface into the attachment layer 25 is θ2'. As shown in FIG. 11, the refractive index of the protective layer 23 is n1, the refractive index of the attachment layer 25 is n3. According to the refraction law: n1 sin θ1=n3 sin θ2', the difference between the refractive index of the protective layer 23 and the refractive index of the attachment layer 25 is much smaller than the difference between the refractive index of the protective layer 23 and the refractive index of the air, so that the refraction angle θ2' is not much different from the incident angle θ1, namely the exit angle of light entering the attachment layer 25 does not change much.

Then, the light moves to the transparent substrate 24 from the attachment layer 25. The refraction angle at which the light leaves the interface into the transparent substrate 24 is θ3', and the refractive index of the transparent substrate 24 is n2. According to the refraction law: n3 sin θ2'=n2 sin θ3', the refractive index n2 of the transparent substrate 24 is greater than the refractive index n3 of the attachment layer 25, so the refraction angle θ3' is smaller than the incident angle θ2'. That is, the exit angle of light entering the transparent substrate 24 becomes larger, and when leaving the transparent substrate 24, the radius of the light coverage area on the diffuser is d3.

Comparing FIG. 10 and FIG. 11, it may be seen that after the protective layer 23 and the transparent substrate 24 stick together through the attachment layer 25, the exit angle at which the light leaves the transparent substrate 24 is increased from the original θ3 to the current θ3', then the radius of the light coverage area has also increased from the original d2 to the current d3. Thus, the light emitted from the Mini LEDs may be diffused to areas between adjacent Mini LEDs, so that the light emitting brightness above the Mini LEDs is closer to the light emitting brightness between the Mini LEDs, and the problem of uneven brightness is alleviated.

In view of the total reflection when light enters two media with different refractive indexes, embodiments of the present disclosure sets the refractive index n3 of the attachment layer 25 to be greater than or equal to the refractive index n1 of the protective layer 23.

When light enters an optically thinner medium from an optically denser medium, total reflection may occur. The total reflection of light in each layer of the backlight module may limit the exit angle of light. As shown in FIG. 10, if the transparent substrate 24 is placed directly above the protective layer 23, there may be an air gap between the protective layer 23 and the transparent substrate 24, creating an air layer. The air medium belongs to an optically thinner medium relative to an optical sheet medium in the backlight module. Therefore, when light enters air from the optical sheet of the backlight module, the phenomenon of total light reflection may not be avoided.

Figure 12:
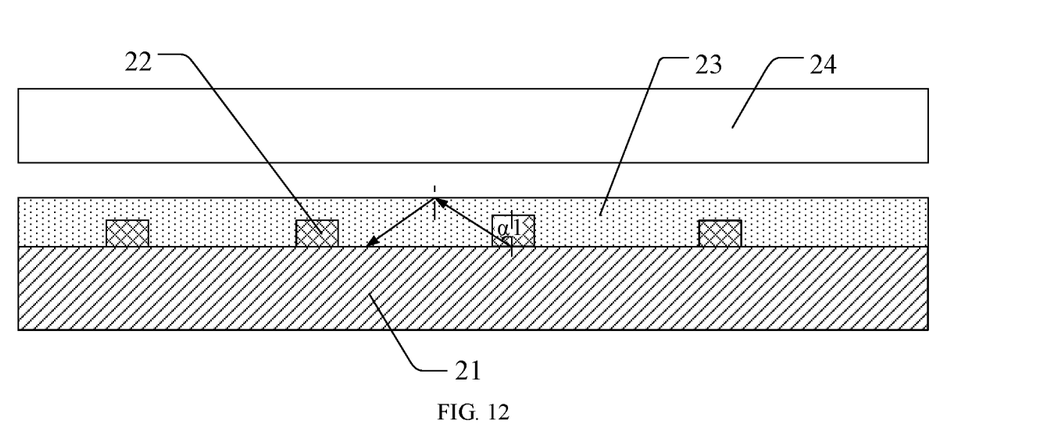
FIG. 12 illustrates a third light emitting path diagram of a backlight module according to some embodiments of the present disclosure.

FIG. 12 is a third light emitting path diagram of the backlight module according to embodiments of the present disclosure. As shown in FIG. 12, if the transparent substrate 24 is directly placed on the protective layer 23, large-angle light emitted from the mini LEDs 22 first enters the protective layer 23. The refractive index n1 of the protective layer 23 is greater than the refractive index n0 of the air layer. When angle α1 at which the light emits from the mini LEDs, i.e., the incident angle at which the light strikes the interface between the protective layer 23 and the air layer, is greater than a critical angle of the interface, the light may not enter the air layer, and is all reflected back to the protective layer 23.

In order to avoid the phenomenon of total reflection, it is necessary to make the protective layer 23 with a material with a low refractive index. When the refractive index n1 of the protective layer is 1.41, a critical angle for total reflection is 44°, that is, among light emitted from the mini LEDs 22, only light with emitting angle less than 44° may enter the air, so as to serve as backlight provided by the backlight module, and the utilization rate of the light source is low.

Figure 13:
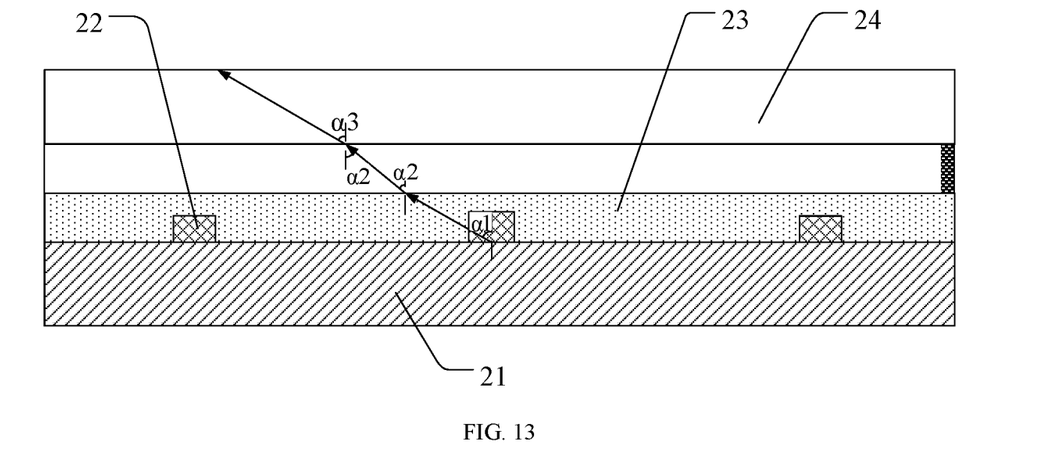
FIG. 13 illustrates a fourth light emitting path diagram of a backlight module according to some embodiments of the present disclosure.

In embodiments of the present disclosure, after the protective layer 23 and the transparent substrate 24 join together through the attachment layer 25, the above problems may be effectively alleviated. FIG. 13 is a fourth light emitting path diagram of the backlight module according to embodiments of the present disclosure. As shown in FIG. 13, after the protective layer 23 and the transparent substrate 24 are closely laminated through the attachment layer 25, light with the emitting angle α1 from the mini LEDs 22 first enters the protective layer 23. As the refractive index n3 of the attachment layer 25 is greater than or equal to the refractive index n1 of the protective layer 23, when light enters the attachment layer 25 from the protective layer 23, light enters from the optically thinner medium to the optically denser medium, and total reflection of light will not occur. Therefore, no matter how large the incident angle of the light is, the light may enter the attachment layer 25 from the protective layer 23.

In practical applications, the refractive index of the attachment layer 25 may be set close to the refractive index of the protective layer 23, so as to ensure that light may successfully enter the attachment layer 25 from the protective layer 23 without changing too much the angle at which the light leaves the interface between the protective layer 23 and the attachment layer 25. The refractive index n3 of the attachment layer 25 is greater than the refractive index n2 of the transparent substrate 24, so the angle at which light moves from the attachment layer 25 to the transparent substrate 24 may be further increased. Thus, the angle of light emitted from the Mini LEDs may not be adjusted too much, emitted light may cover the areas between the Mini LEDs. Therefore the difference between the light emitting brightness above the Mini LEDs and between the Mini LEDs is reduced, thereby effectively alleviating the problem of uneven brightness.

In some embodiments, the protective layer 23 may usually be made of colloidal materials such as silica gel and epoxy resin, and the refractive index may be 1.4-1.6. The transparent substrate 24 may be made of plastic, such as PMMA and methyl pentene copolymer (TPX), and the refractive index may be 1.4-1.5. The attachment layer 25 may be made of colloidal materials such as silica gel and epoxy resin, or a transparent double-sided adhesive layer, and the refractive index may be 1.4-1.6.

By selecting the materials of the protective layer 23, the transparent substrate 24 and the attachment layer 25, the refractive index difference between the three members may be smaller. Meanwhile, the conditions that the refractive index of the attachment layer 25 is greater than or equal to the refractive index of the protective layer 23, and the refractive index of the attachment layer 25 is greater than the refractive index of the transparent substrate 24 may be met. Thus, light emitted from the mini LEDs 22 may be effectively protected against the phenomenon of total reflection of large-angle emitted light at the interfaces of the three layers. Also, the angle at which light enters the transparent substrate 24 and layers above it may be enlarged.

For example, when the refractive index of the protective layer 23 is 1.54 and the refractive index of the transparent substrate is 1.45, light emitted at an angle of 60° from the mini LEDs 22 meets: 1.54×sin 60°=1.45×sin θ according to the refraction law, where θ is the angle at which light moves in the transparent substrate 24. It may be calculated to obtain that θ is 60.45°, which is much larger than an exit angle of the backlight modules in the prior art. Thus, the problem of uneven brightness of the backlight modules is effectively alleviated.

In embodiments of the present disclosure, the thickness of the attachment layer 25 is much less than that of the transparent substrate 24, and the thickness of the attachment layer 25 may be set to be less than 0.1 mm under normal circumstances. The smaller the thickness of the attachment layer 25, the smaller the influence of the attachment layer 25 on the shift of light. Therefore, the effect of the attachment layer 25 on the area of emitted light may be ignored in the layout design of the mini LEDs 22, so as to simplify the design procedure.

Figure 14:
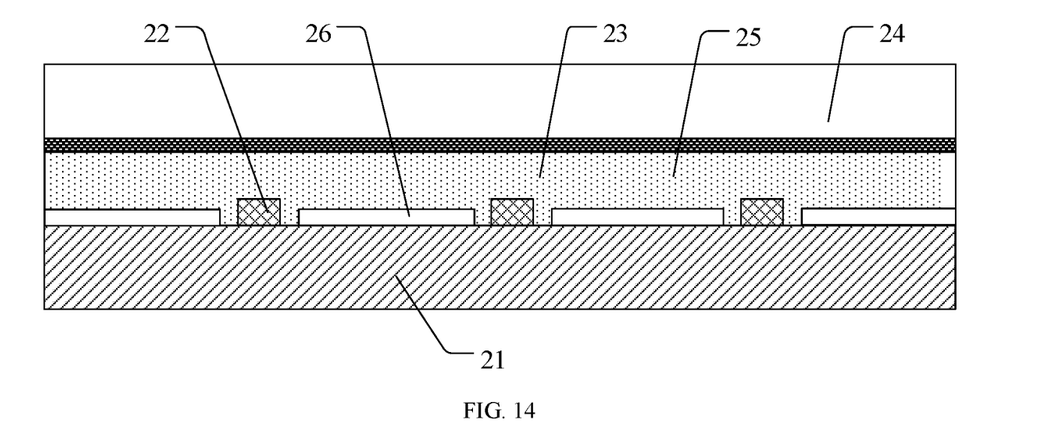
FIG. 14 illustrates a second cross-sectional view of a backlight module according to some embodiments of the present disclosure.
Figure 15:
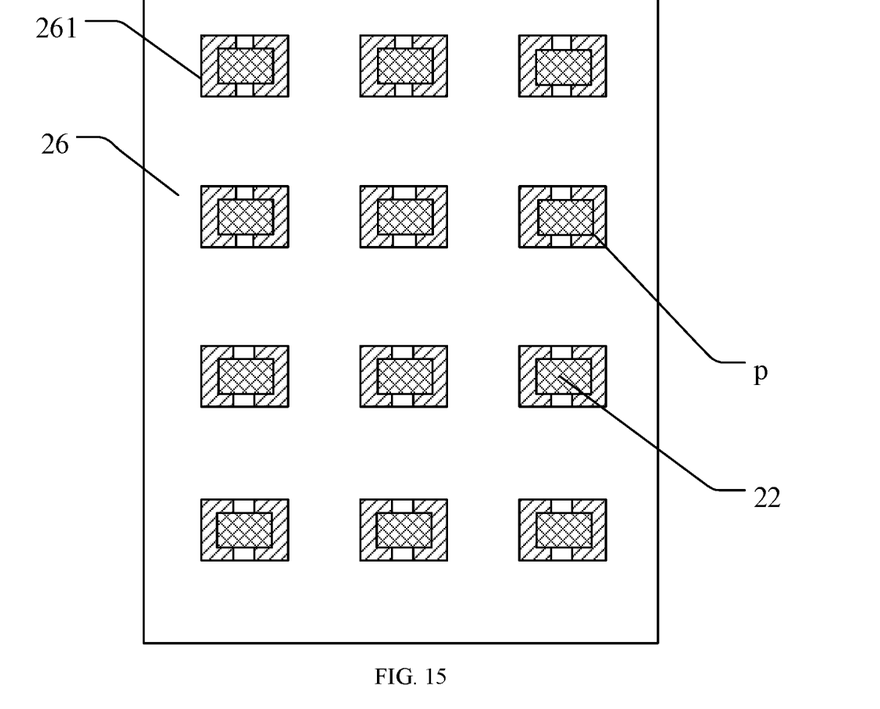
FIG. 15 illustrates a top view of a backlight module according to some embodiments of the present disclosure.

FIG. 14 is a second cross-sectional view of the backlight module according to embodiments of the present disclosure. As shown in FIG. 14, the Mini LED board according to embodiments of the present disclosure further includes: a reflective coating 26, disposed on a side, close to the mini LEDs 22, of the circuit board 21. FIG. 15 is a top view of the backlight module shown in FIG. 14. As shown in FIG. 15, the reflective coating 26 includes openings 261 configured to expose the mini LEDs 22.

The reflective coating 26 is disposed on a surface of a side, facing the mini LEDs 22, of the circuit board 21. The reflective coating 26 may be a protective layer above the circuit board. When the surface of the circuit board 21 is coated with a reflective material, the protective layer has a reflective effect as well, and may reflect light emitted into one side of the circuit board 21 back, thereby improving the efficiency of light utilization. In embodiments of the present disclosure, the reflective coating 26 may be made of materials such as white oil.

The surface of the circuit board is coated with the while oil material after wiring is completed, and areas where the pads p configured to solder the mini LEDs 22 are located are exposed through a process such as etching. In embodiments of the present disclosure, the protective layer with the reflective effect is referred to as the reflective coating. As shown in FIG. 15, the reflective coating 26 has openings 261 configured to expose the pads p where the mini LEDs are soldered. In the subsequent manufacturing process, the mini LEDs 22 may be soldered on the corresponding pads of the circuit board, so as to be located in the corresponding openings 261.

Figure 16:
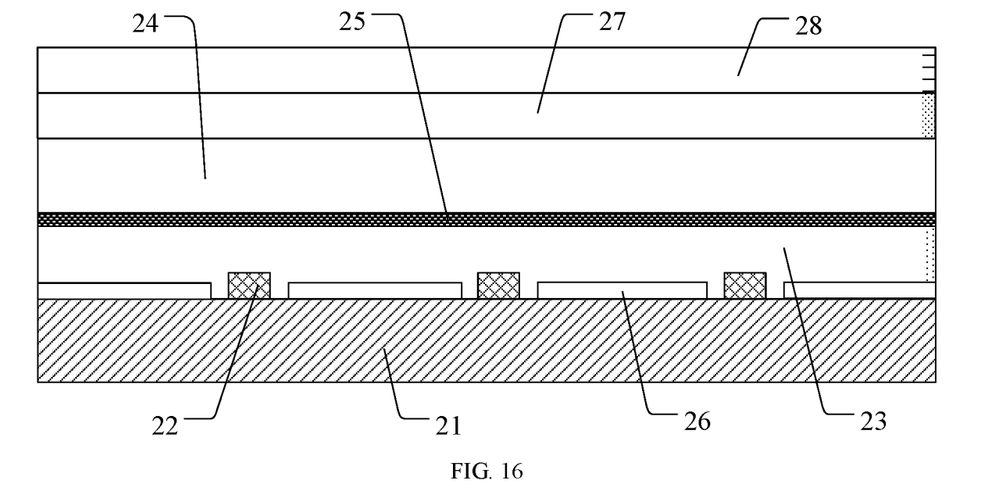
FIG. 16 illustrates a third cross-sectional view of a backlight module according to some embodiments of the present disclosure.

FIG. 16 is a third cross-sectional view of the backlight module according to embodiments of the present disclosure. As shown in FIG. 16, the backlight module according to embodiments of the present disclosure further includes: a diffuser 27 and an optical sheet 28.

The diffuser 27 is disposed on a side, facing away from the protective layer 23, of the transparent substrate 24. A scattering material in the diffuser may continuously refract and reflect light passing through, so as to achieve the effect of dispersing the light to obtain the uniform light. A material of the diffuser is generally selected from at least one of polymethyl methacrylate (PMMA), polycarbonate (PC), polystyrene (PS), or polypropylene (PP).

The optical sheet 28 is disposed on a side, facing away from the transparent substrate 24, of the diffuser 27. The optical sheet 28 may include one or more of a prismatic lens, a quantum dot film, a diffuser, a reflective polarizer, etc. The purpose of adding these sheets to the backlight module is to make the backlight module adapt to various practical applications. For example, the prismatic lens may change the exit angle of light, thereby changing the viewing angle of the display apparatus. The quantum dot film may provide quantum dot light emission with higher monochromaticity, and is applied to quantum dot TVs to improve the display color gamut of the TVs. The reflective polarizer may improve the utilization rate of light, and meanwhile, make emitted light have the property of polarization, so the use of a polarizer under a liquid crystal display panel is omitted.

The display apparatus in the present disclosure includes: the backlight module, configured to provide the backlight; and the display panel, disposed on the light emitting side of the backlight module, and configured to display the images. The backlight module includes the mini LED board, serving as the backlight source. The mini LED board includes the circuit board, having the bearing and support function, and configured to provide power; the mini LEDs, disposed on the circuit board; and the protective layer, covering the mini LEDs and the circuit board, and configured to encapsulate and protect the mini LEDs. The backlight module further includes a transparent substrate, disposed on the side, facing away from the mini LEDs, of the protective layer; and the attachment layer, located between the protective layer and the transparent substrate, and configured to attach the protective layer and the transparent substrate. The refractive index of the attachment layer is greater than the refractive index of the transparent substrate. After the protective layer and the transparent substrate are closely joined together through the attachment layer, there is no air layer between the protective layer and the transparent substrate. Since the refractive index of the attachment layer is greater than that of the transparent substrate, the angle at which light enters the transparent substrate from the attachment layer may increase, so that the coverage of exit light may increase. Thus, light emitted from the Mini LEDs can be diffused to the areas between adjacent Mini LEDs, so that light emitting brightness above the Mini LEDs is closer to light emitting brightness between the Mini LEDs, and the problem of uneven brightness of backlight modules can be alleviated.

It will be apparent to those skilled in the art that various modifications and variations can be made in the present disclosure without departing from the scope of the present disclosure. Thus, it is intended that the present disclosure cover these modifications and variations of the present disclosure provided they come within the scope of the appended claims of the present disclosure and their equivalents.

What is claimed is:

1. A display apparatus, comprising:
    a backlight module, configured to provide backlight; and
    a display panel, disposed on a light emitting side of the backlight module, and configured to image display; wherein
    the backlight module comprises a light-emitting diode (LED) board with one or more LEDs; and
    the LED board comprises:
        a circuit board configured to provide power, and comprising a plurality of pads for soldering the one or more LEDs;
        a reflective coating, configured to cover the circuit board, and comprising a plurality of openings for exposing the plurality of pads; and
        the one or more LEDs, configured to be soldered on the plurality of pads in the plurality of openings;
        wherein a first opening of the plurality of the openings is configured to expose one or more pads without exposing other structure on the circuit board, a size of the first opening of the plurality of the openings is greater than a size of a first LED of the one or more LEDs and configured to tolerate a movement distance produced by expansion or contraction of the circuit board on the basis of the size of the first LED, and the size of the first opening meets a requirement of soldering the first LED after the expansion and contraction of the circuit board;

wherein both the circuit board and the first LEd are rectangular; and a long side of the first LED is parallel to a short side of the circuit board.

2. The display apparatus according to claim 1, wherein the first opening in the reflective coating are rectangular; and a long side of the first opening is parallel to the long side of the first LED.

3. The display apparatus according to claim 2, wherein a size of a long side of the circuit board, a size of a short side of the first opening, and a size of a short side of the first LED meet:

$$Py - Cy \geq (2\%_{00} - 5\%_{00}) \times Ly;$$

wherein Py represents a length of the short side of the first opening, Cy represents a length of the short side of the first LED, and Ly represents a length of the long side of the circuit board.

4. The display apparatus according to claim 2, wherein a size of the long side of the first LED and a size of the long side of the first opening meet:

$$Cx < Px \leq Cx + d;$$

wherein Cx represents a length of the long side of the first LED, Px represents a length of the long side of the first opening, and d represents a length of an electrode of the first LED in a direction parallel to the long side of the first LED.

5. The display apparatus according to claim wherein the backlight module comprises a plurality of LED boards, and respective circuit boards of the plurality of LED boards are arranged in a direction parallel to a short side of the circuit board.

6. The display apparatus according to claim 1, wherein a size of the first LED is 50 μm-300 μm.

7. The display apparatus according to claim 1, wherein a length of the circuit board is 200 mm-800 mm, and a width of the circuit board is 100 mm-500 mm.

8. The display apparatus according to claim 1, wherein the backlight module further comprises:

a protective layer, configured to cover a surface of a side of the reflective coating facing away from the circuit board, and a surface of a side of the first LED facing away from the circuit board.

9. The display apparatus according to claim 8, wherein the backlight module further comprises:

a transparent substrate, disposed on a side, facing away from the circuit board, of the protective layer;

a diffuser, disposed on a side, facing away from the protective layer, of the transparent substrate; and an optical sheet, disposed on a side, facing away from the transparent substrate, of the diffuser.

10. The display apparatus according to claim 9, wherein the apparatus further comprises:

an attachment layer, disposed between the protective layer and the transparent substrate, and configured to attach the protective layer and the transparent substrate;

wherein a refractive index of the attachment layer is greater than a refractive index of the transparent substrate.

11. The display apparatus according to claim 10, wherein the refractive index of the attachment layer is greater than or equal to a refractive index of the protective layer, wherein the refractive index of the protective layer is 1.4-1.6, and the refractive index of the transparent substrate is 1.4-1.5.

12. The display apparatus according to claim 10, wherein a thickness of the attachment layer is less than 0.1 mm, and a thickness of the transparent substrate is 1 mm-3 mm.

* * * * *